Patented Aug. 10, 1937

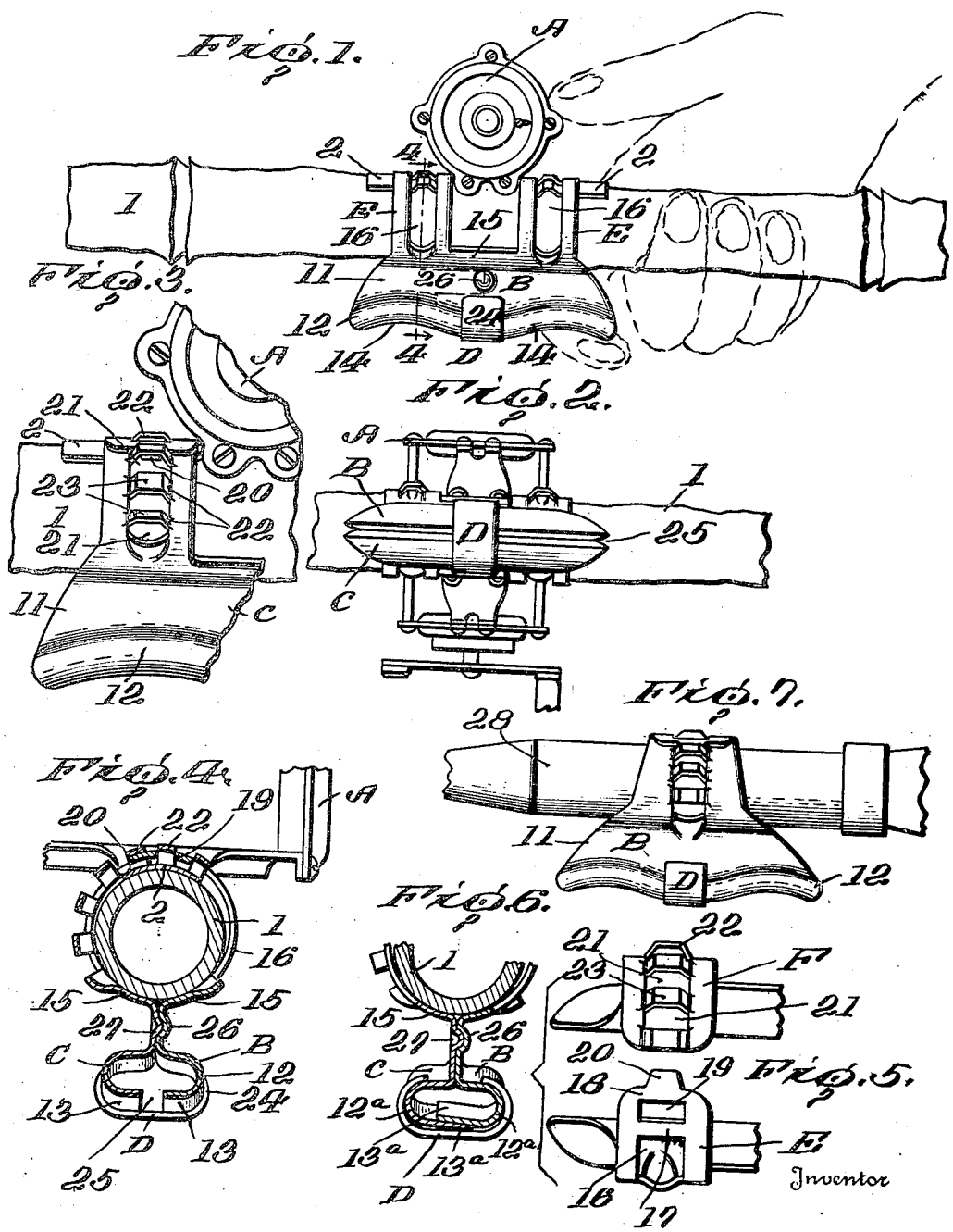

2,089,538

UNITED STATES PATENT OFFICE 2,089,538

FISHLINE REEL HOLDER AND BALANCING HANDHOLD DEVICE FOR FISHING POLES

Charles J. Clarke, Kingsburg, Calif.

Application March 17, 1936, Serial No. 69,375

7 Claims. (Cl. 43—22)

This invention is directed to improvements in fishline reel holders and balancing handhold devices for fishing poles, and has as one of its primary objects the provision of such a device which is light, inexpensive, yet strong and highly efficient in operation.

Another object of the invention is the provision of a device which provides a balancing handhold for a fish rod and at the same time serves as a clamp by means of which the ordinary and well known and commonly used types of fishing reels may be readily, quickly and firmly clamped to either steel or bamboo fishing rods.

Other and further objects of the invention are the provision of such a device which is so constructed as to work equally well on fishing rods of different diameters; a device which is composed of only three parts which can be stamped from metal and as a consequence can be cheaply manufactured; a device which is made from a light gauge tempered metal with the result that the complete device is extremely light; and a device which can be applied to the fishing rod without the necessity of slipping or moving the device over the rod handle or moving the device downwardly over the guide end of the rod, which manners of application of a reel clamping device are objectionable.

Another and still further object of the invention is the provision of a device of the character described which in addition to functioning to clamp a fishing reel to a rod includes a finger or handhold portion to provide a balancing handhold for the rod.

Other further objects and improved results of the present invention will appear in more detail from the following description when read in the light of the accompanying drawing.

In the drawing:

Fig. 1 is a view in side elevation illustrating the application of the invention in securing a reel to a fishing rod of the bamboo type.

Fig. 2 is a bottom plan view of Fig. 1.

Fig. 3 is a fragmentary view in side elevation illustrating in detail one of the ring members encircling the rod and clamping one end of the reel base thereto.

Fig. 4 is a transverse vertical sectional view taken on the line 4—4 of Fig. 1 looking in the direction indicated by arrows.

Fig. 5 is a detailed fragmentary view illustrating the construction which provides an adjustable connecting means for the ends of the semicircular shaped bands.

Fig. 6 is a fragmentary vertical sectional view illustrating a modified form of the handhold portion of the device.

Fig. 7 is a view in side elevation illustrating a modified form of the invention.

Having reference now to Figs. 1 to 5 of the drawing, 1 indicates a fishing rod which although indicated as being of the bamboo type can readily be of the steel rod type as the present invention is equally applicable to both types.

A conventional fishing reel is indicated at A and is provided with the usual base 2 of an arc shape in cross section and when the reel is applied to a rod said base extends longitudinally of and rests upon one side thereof.

The present improved invention comprises a pair of complementary members B and C which together with a removable clip D constitute a combined handhold and clamp for securely clamping the reel in proper operative position upon the fishing rod.

The complementary members B and C are identical with the exception of their band or ring portions. The ring portions of the member B are designated E and the ring portions of the member C at F.

Each of these members comprises a neck portion 11 which when the device is in operation extends longitudinally of the rod. The lower edges of these necks are bent into a U shape as indicated at 12, and the bottom leg 13 of the U of one member extends towards the similar portion of the other member, as clearly illustrated in Fig. 4 of the drawing, to form jointly a finger hold as clearly illustrated in Fig. 1 of the drawing. To provide a finger hold at each end of the device the legs 13 are of wavy configuration to provide depressions 14 adjacent each end of the necks.

At their upper edges the necks 11 are provided with outwardly curved portions constituting bases 15 which are adapted to abut one side of the fishing pole and it is from these bases that the semicircular bands E and F extend.

Having reference now particularly to the member B, it will be seen that there is a pair of these semicircular bands extending from the base one being positioned at each end of the base. These bands are cut away throughout the greater portion of their length to form longitudinally elongated openings 16. Adjacent its lower end this opening is provided with a cross bar or leg 17 which is in spaced relationship to the end 18 of the band to provide an opening 19. At their extremities the bands are provided with an extending tongue 20.

Having reference now to the member C it will be seen that the bands F of this member are provided alternately throughout their length with openings 21 separated by outwardly bulged cross bars 22 which have a flat portion 23 of a length similar to the width of the tongues 20 of the bands E of the opposite member B.

It will be seen that in actual use the pair of band members of one member are connected to the band members of the opposite member to form rings which encircle the fishing rod. Due to the construction provided these rings are of adjustable diameter. In attaching the bands of one member to the bands of the other the tongues 20 of one pair of bands are placed into the openings 21 of the bands of the other member, as clearly indicated in Fig. 4 of the drawing. It will be seen that the openings 19 and 21 of the bands are of a width similar to the width of the cross bars 17 and 22 with the result that the tongues 20 will enter the openings 21 and project beneath and engage under the flat portions 23 of the cross bars 22, at one side of the openings, while the outwardly bulged cross bars or teeth 22 at the opposite side of the openings project upwardly and outwardly through the openings 19 of the bands E. The cross bars 17 of the band members E lie across the openings 21 of the band members F and between the two cross bars 22 thereof. The adjustment may be such, due to the diameter of the rod, that the ring may be sufficiently small that the bands overlap one another very considerably with the result that one or more cross bars 22 of the band members F will be positioned in the elongated longitudinal openings 16 of the band members E.

From the construction just described it will be readily understood that the bands can be quickly and easily adjustably connected to one another and that when once connected together their interlocking engagement is such as to prevent any possibility of the bands pulling apart. The tongues 20 prevent the band members from springing away from one another while the engagement of the cross bars in their respective openings is in reality like a toothed engagement and absolutely prevents the bands from moving longitudinally in respect to one another.

It will be at once apparent that the band members can be made to encircle the rod at any desired point throughout its length without the necessity of either slipping the rings over the handle end of the rod or over the guide end of the rod. When the members B and C are placed in back to back relationship with their bands properly connected to make a ring of the proper size to encircle a rod, it will be found that the necks of the handhold portion of the device will be in spaced relationship to one another. The members B and C are made of tempered metal and consequently the neck portions of the members can be moved towards one another against the natural and normally inherent resilience of the metal of which they are composed. By forcing the necks of these complementary members towards one another the rings which encircle the rod and the base portion of the reel will be tightened under spring tension and it is necessary merely to slip the U-shaped clip D over the bulged portions 12 of the members to securely lock the rings in tightly clamped position. Inasmuch as the neck portions 11 and the bulged portions 12 of the members will tend normally to move outwardly from one another, it will be obvious that the rings are clamped under resilient tension and that the downwardly curved portions 24 of the clip D which telescopically receive the bulged portions 12 of the members, constitute the means to prevent said movement. By reference to Fig. 4 of the drawing it will be seen that the bottoms 13 of the members do not meet and that there is a space 25 between their opposing ends. This space is left intentionally so that the bottom of the handhold portion of the device will afford a wider bearing surface for the finger of the hand which is used to grip the rod.

To guard against a longitudinal movement of the neck of one member in respect to the neck of the other, the neck of the member B is provided with a circular depression 26 which receives the circular bulge 27 of the neck portion of the member C when the parts are in their proper operative positions and clamping a reel upon a rod, as clearly appears in Fig. 4 of the drawing.

In Fig. 6 of the drawing a modified form of the invention is illustrated. In this form the invention is identical with the preferred form with the exception that the tops of the handhold portion of the device are adapted to overlap. The result of this is that the top of the handhold portion is not as wide as in the preferred form. In Fig. 6 it will be seen that the bulged portions 12ª are so shaped that when the clip D is in position to hold the parts in their clamped relationship that the bottoms 13ª overlap one another. In this form of the invention it is necessary that the clip D be somewhat shorter than the clip in the preferred form of the invention.

Fig. 7 is a slight modification of the invention in that a fishing rod handhold only is provided and no means is provided for clamping a fishing reel upon a rod. No specific description of this modified form of the invention is considered necessary in that it is identical with the preferred form with the single exception that a single semicircular band is carried by each of the members B and C with the result that a single ring encircles the rod. In this instance the rod 28 is illustrated as of the steel rod type rather than of the bamboo type. The bands of the two complementary members are adjustably secured together just as has been described in connection with the preferred form of the invention.

From the foregoing description it will be seen that I have provided a combined fishing reel holder and rod balancing handhold device which is extremely simple of construction and inexpensive of manufacture. By reason of the parts being made of a tempered metal an extremely light gauge of metal can be used without sacrificing strength and the result of this is that the complete device is extremely light and as a matter of fact will weigh less than one ounce. It will also be seen that the method of interlocking the bands together is such as to assure against the possibility of these band members being detached from one another. The tighter these bands are clamped about the rod the greater the pressure will be between the overlapping ends of the bands and the tighter will be the interlocking connection between the cooperating interlocking parts of these bands.

It will also be obvious that the device is such that the adjustable connection between the band members can be quickly and rapidly made and that the complete device can be quickly and rapidly attached to and clamped about the rod and reel base.

I claim:

1. A device of the character described, comprising a pair of segmental rings adapted to encircle a fishing rod, cooperative interlocking portions carried by said ring segments whereby said segments are adjustable in respect to one another to make rings of different diameters, means to tighten and clamp said rings to said rod, and means to hold said rings in said clamped position.

2. A device of the character described, comprising a two-part clamp, each of said clamp parts carrying a pair of semicircular shaped extensions, means to adjustably interlock the extensions of one part to the extensions of the other to form a pair of rings adapted to encircle a fishing rod, each of said parts provided with a portion adapted to extend outwardly from said rod, and means for securing the last named outwardly extending portions together under resilient tension to tighten and clamp said rings about the rod.

3. A device of the character described, composed of two parts, each of said parts provided with a pair of semicircular shaped extensions, means to adjustably connect the ends of one pair of extensions to the ends of the other pair to provide a pair of rings of the proper diameter to encircle a fishing rod, the other ends of said extensions each terminating in a base adapted to bear against one side of the fishing rod, said base portions provided with extending portions arranged in spaced parallel relationship, and attachable and detachable means for securing said last named extensions together for tightening and clamping said rings about the fishing rod.

4. A construction such as defined in claim 3, wherein the last named extension portions provide a finger and balancing handhold for the fishing rod.

5. A device of the character described, composed of two parts each of which has a base portion provided with a pair of semicircular shaped members, means to adjustably connect the ends of one pair of semicircular extensions to the ends of the other pair to provide a pair of rings of the proper diameter to encircle a fishing rod, the base of each member provided with a neck having a U-shaped lower edge, said members being composed of resilient material, and a clip adapted to slide over the U-shaped edges of said members to hold the same in adjacent relationship under spring tension for the purpose of tightening and clamping said rings about said rod under resilient tension.

6. A device of the character described, composed of two parts, each of said parts provided with a pair of semi-circular shaped extensions, means to adjustably connect the ends of one pair of extensions to the ends of the other pair to provide a pair of rings of the proper diameter to encircle a fishing rod, the other ends of said extensions being provided with extending portions adapted to cooperate to provide a finger and balancing handhold for the fishing rod, and means interconnecting said last named extending portions for drawing them towards one another to tighten and clamp said rings to the fishing rod.

7. A device of the character described, composed of two parts each of which includes a pair of semi-circular shaped members, means to adjustably connect the ends of one pair of semi-circular members to the ends of the other pair to provide a pair of rings of the proper diameter to encircle a fishing rod, the other ends of each pair of said semi-circular shaped members being joined by a neck having a U-shaped lower edge, and means interconnecting the neck of each pair to hold the same in adjacent relationship for the purpose of tightening and clamping said rings about said rod and to form a finger and balancing handhold for the fishing rod.

CHARLES J. CLARKE.